United States Patent [19]
Kyle

[11] Patent Number: 4,604,203
[45] Date of Patent: Aug. 5, 1986

[54] COOKING OIL FILTERING APPARATUS AND FILTER THEREFOR

[75] Inventor: Robert C. Kyle, Minneapolis, Minn.

[73] Assignee: Minnesota Mining and Manufacturing Co., Saint Paul, Minn.

[21] Appl. No.: 650,414

[22] Filed: Sep. 14, 1984

[51] Int. Cl.$^4$ .............................................. B01D 23/28
[52] U.S. Cl. ................................. 210/489; 210/500.1; 210/497.3; 210/DIG. 8; 55/527
[58] Field of Search .................. 210/500.1, 489, 497.3, 210/DIG. 8; 55/527

[56] References Cited

U.S. PATENT DOCUMENTS

| | | | |
|---|---|---|---|
| 185,604 | 12/1876 | Watt | 210/497.3 |
| 2,865,511 | 12/1958 | Hopkins, Jr. | 210/497.3 |
| 3,419,151 | 12/1968 | Smith et al. | 210/489 |
| 3,735,871 | 5/1973 | Blake | 210/167 |
| 3,759,388 | 9/1973 | Thomason | 210/167 |
| 3,797,378 | 3/1974 | Morris | 99/408 |
| 3,849,312 | 11/1974 | Wecker, Sr. | 210/DIG. 8 |
| 3,972,694 | 8/1976 | Head | 55/527 |
| 4,052,319 | 10/1977 | Friedman | 210/465 |
| 4,324,574 | 4/1982 | Fagan | 55/527 |

FOREIGN PATENT DOCUMENTS 2080250 2/1982 United Kingdom .

OTHER PUBLICATIONS

Wente, Industrial Engineering Chemistry, vol. 8, p. 1342 SEQ (1956).
Report No. 4364, Naval Research Lab., Pub. 5-25-54, "Mfgr. of Super Fine Organic Fibers", Wente et al.

*Primary Examiner*—Tim Miles
*Attorney, Agent, or Firm*—Donald M. Sell; James A. Smith; Richard Francis

[57] ABSTRACT

A cooking oil filtering apparatus has a frame and a filter supported therein. The filter is an assembly of juxtaposed layers including a filter layer formed of a uniformly porous web comprising randomly distributed, randomly interentangled, synthetic polymeric blown microfibers that are less than 10 microns in diameter and a support layer of highly porous, relatively stiff, light weight sheet material, more porous than the filter layer.

7 Claims, 5 Drawing Figures

4,604,203

COOKING OIL FILTERING APPARATUS AND FILTER THEREFOR

DESCRIPTION

1. Technical Field

The present invention relates to a cooking oil filtering apparatus and a filter therefor.

2. Background Art

The commercial use in restaurants and institutions of cooking devices which utilize large volumes of cooking oil is very extensive. Oil is maintained at about 160° to 210° C. in such devices to fry various comestibles such as potatoes, fish, chicken, doughnuts, pie and the like. Typically, the cooking oil is maintained at such temperatures throughout every hour of a 12 to 18 hour day. The comestible is usually contained in a wire cage which can be dipped into the boiling oil to expose its contents to contact with the oil and then lifted out of the oil when a predetermined cooking time has passed.

In many cases, the comestible is first dipped into a batter or otherwise coated before it is immersed in the oil and typically fragments of the coating or the comestible break loose to be suspended in the oil or to sink to the bottom of the vat. As a result, there is an accumulation of such particles in the cooking oil which, with continued heating, causes degradation of the fragments and the oil, resulting in undesirable tastes and odors which taint subsequently cooked food.

While some commercial establishments will dispose of the oil when degradation has progressed to a certain point, many merely filter the cooking oil, typically on a daily basis, to remove the particulate matter. In cases where large quantities of food are cooked on a daily basis, such as in fast food outlets, filtration may be performed several times a day. In most cases, the cooking oil is filtered while it is at or near the cooking temperature, mainly because hot cooking oil has a lower viscosity and is therefore more easily filtered. In fact, some cooking oils, while liquid near or at the cooking temperature, are solid or semi-solid at lower temperature or room temperature. In that regard throughout the present disclosure, the term "cooking oil" is used to refer to an organic cooking media which is always liquid at cooking temperature but may not be liquid at lower temperatures.

In most cases the hot cooking oil is filtered using a batch system where the cooking oil is completely removed from the vat in which it is contained. Other filtering devices are adapted for a continuous filtering operation where the oil is continuously passed through a filter. In the batch filtration process, filtration may be accomplished using a gravity filter by using a frame or housing which is fitted with a filter cone, disc, bag, or other shape. Cooking oil filtration devices assisted by vacuum or pressure to improve the flow rate are also known and used extensively.

Various devices describing filtration of cooking oil are described in the following U.S. patents: U.S. Pat. Nos. 3,735,871 (wire mesh filtering assembly), 3,759,388 (multilayer roll of thin fibrous paper sheets having interlocking fibers between layers as a filter), 3,797,378 (melamine formaldehyde impregnated mercerized wood fiber pulp filter), 4,052,319 (polyester or polytetrafluoroethylene filter) and U.K. Patent Application No. 2,080,350 (fibrous paper pulp material combined with adsorbent such as activated clay as a filter).

DISCLOSURE OF INVENTION

The present invention provides a unitary, self-contained cooking oil filter which filters quickly, removing substantial amounts of suspended particulate matter. The filter of the invention has an adequate filtration efficiency without appreciable slowing of filtration, especially in gravity filtering operations.

The cooking oil filtering apparatus of the present invention has a frame and a filter supported therein. The filter is an assembly of juxtaposed layers including a filter layer formed of a uniformly porous web comprising uniformly distributed, randomly interentangled, synthetic polymeric blown (preferably melt blown) microfibers that are less than 10 microns in diameter and a support layer of highly porous, relatively stiff, light weight sheet material, more porous than the filter layer. The support layer is preferably a nonwoven web or paper sheet. The filter layer and the support layer are formed of materials that are not significantly altered at the cooking oil temperatures which are typically on the order of 180° C.

The typical shape of the filter for gravity filtration is as a cone. When oil is forced through the filter, either by vacuum applied to the outlet side or positive pressure applied to the inlet side, the support web preferably has a greater stability for supporting the filter layer. The preferred support layer for such use is a heavy weight spun-bonded rayon scrim or porous paper.

BRIEF DESCRIPTION OF DRAWINGS

The invention is further illustrated by reference to the accompanying drawings, wherein.

DETAILED DESCRIPTION

Figure 1:
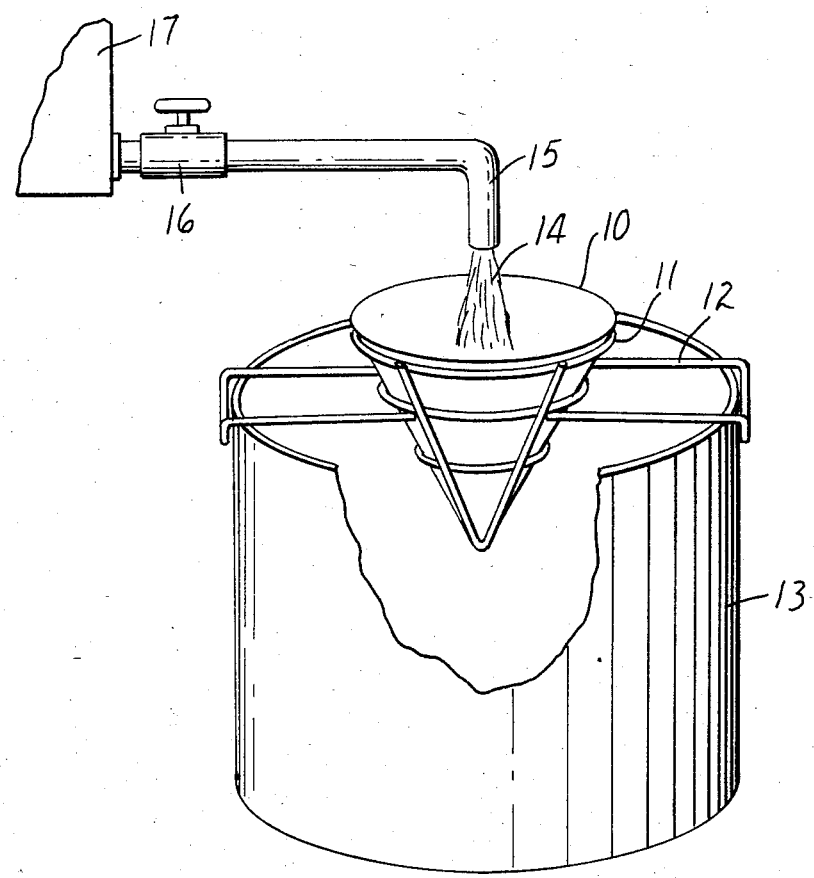
FIG. 1 is a perspective view with parts cut away to show detail of a filtering apparatus according to the present invention being utilized to filter a stream of cooking oil.
Figure 2:
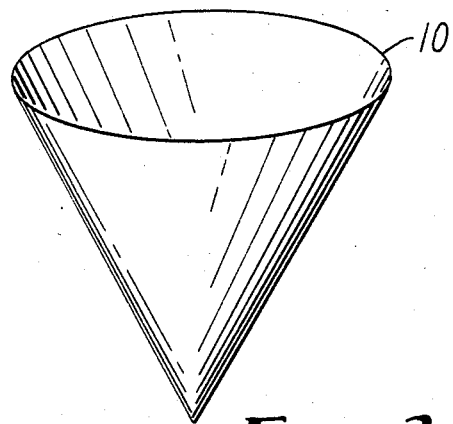
FIG. 2 is a perspective view of a cooking oil filter in accordance with the present invention in the shape of a cone.
Figure 3:
FIG. 3 is a perspective view of a filter in accordance with the present invention in the shape of a disc.
Figure 4:
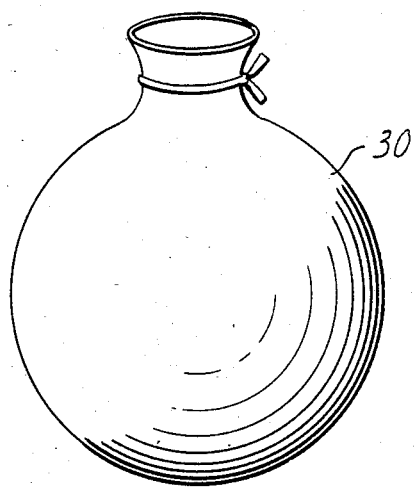
FIG. 4 is a perspective view of a filter in accordance with the present invention in the shape of a bag.

As depicted in FIGS. 1-4, the filter of the present invention may be in any of a variety of conventional shapes that are presently commercially used for other filter materials or any shape which is contemplated by future development. For example, the filter may be in the shape of a cone 10, as depicted in FIGS. 1-2, a disc 20 as depicted in FIG. 3 or a bag 30 as depicted in FIG. 4. The bag-shaped filter 30 may take any of a variety of forms which typically have sidewalls and a bottom which may be formed of one piece or of several pieces seamed together to provide a structure which is closed except for an opening or mouth which may be fastened to the discharge outlet of the apparatus to receive the contaminated oil being filtered.

As depicted in FIG. 1, cone-shaped filter 10 may be supported in a suitable frame 11 which may have arms 12 for support on opposite edges of container 13. So supported, the filter is positioned to receive an oil stream 14 from a conduit 15 connected by a valve 16 to an oil vat 17. Filtered oil is collected in container 13 after it passes through filter 10.

Figure 5:
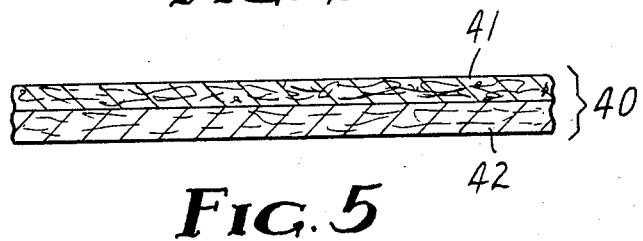
FIG. 5 is a cross sectional view of the filter in accordance with the present invention showing the respective layers.

Filter segment 40 is depicted in FIG. 5 as representative of the cross-section of all of the filters of the present invention in that it is formed of at least two layers including filter layer 41 and the support layer 42.

The filter layer of the filter of the present invention is a blown microfiber web having a fiber size less than 10 microns in diameter. The microfiber web is very lightweight for fast filtration, very uniform in fiber distribution for efficient filtration and resistant to hot cooking oil at or about 180° C. For filter use in the gravity mode, the microfiber web should be both light-weight and have uniform fiber distribution with no thin spots or voids.

Microfiber webs, useful for filtration in the gravity mode, preferably weigh in the range of about 30 and 47 g/m$^2$, have a flow time to pass 200 ml of cooking oil in the range of about 22 to 40 seconds and have a pressure drop of about 17 to 40 Pa, resulting in a filtering efficiency of at least 75%. Cooking oil filters under applied pressure, either by vacuum on the exit side or by pressure on the inlet side, preferably weigh on the order of 60–200 g/m$^2$.

Both the support layer web and the filter layer web, in addition to being significantly unaffected by hot cooking oil, preferably meet the requirements of the United States Food, Drug and Cosmetic Act for direct contact with food. Materials which meet these requirements include rayon and cellulose for the support web, type 6 nylon for the filter, and polyethylene terephthalate and other polyamides for the filter and the support web. The lower melt viscosity type nylon 6 polymers are preferred for the filter layer. The polymers may contain various additives to improve performance and processability, for example, a nucleating agent such as minute quantities of particulate material, e.g., TiO$_2$ or talc to increase the rate of crystallization.

Useful methods of preparing melt blown microfiber filter media are described in Wente, Industrial Engineering Chemistry, Vol. 8, Page 1342 SEQ (1956), and Report Number 4364 of the Naval Research Laboratories, published May 25, 1954, entitled "Manufacture of Super Fine Organic Fibers" by Wente, V. A., Boone, C. P., and Fluharty, E. L.

Melt blown microfibers are very fine fibers prepared by extruding liquified fiber-forming material through orifices in a die into a high velocity gaseous stream, where the extruded material is first attenuated by the gaseous stream, typically air, and then solidifies as a mass of the fibers without blocking or compaction of the mass. The fibers are typically collected on a finely perforated screen with a gas withdrawal apparatus positioned behind the screen, to create a condition of lower pressure behind the screen, to assist in the deposition of the fibers and removal of gases from the gaseous stream.

The characteristics of a melt blown microfiber web product are known to be influenced by such processing parameters as the melt temperature, air:polymer mass ratio, collector vacuum, and die-to-collector distance.

The melt temperature required to produce the melt-blown web is dependent on the type of material which is to be processed and is strongly correlated to the melt rheology of that material. Since a low viscosity is required in order for the melt to be rapidly attenuated by the impinging fluid, a temperature sufficient to cause thermally-induced molecular weight reduction is typically required. If temperatures are too low, the extrudate will not attenuate properly and therefore will not form the requisite microfibers and will contain much non-fibrous material. A filter medium produced under these conditions will allow the fluid to be filtered to pass very rapidly, but very little fine particulate matter will be removed. If the temperature is too high, the microfibers formed will be sub-micron in diameter, are difficult to collect on the low-pressure surface, and result in a filter medium which is highly efficient in the removal of particulate matter but passes the filtrate much too slowly for practical use. For the polyamide nylon 6 materials used in the examples, this temperature is preferably between 305° and 320° C.

The air:polymer mass ratio determines the degree of attenuation and therefore the final diameter of the microfibers produced. The practical range for this ratio preferably is between 10 and 50 to 1. The higher the ratio, the lower the resultant fiber diameter. It has long been recognized that the smaller the diameter of fibers in a filtration medium, the more efficient the medium becomes, but also the lower the flow-through rate. The filtration medium of the invention resulted from air:polymer mass ratios of between 10 and 30 to 1.

The collector vacuum affects the formation of the filter fabric. If insufficient vacuum exists at the collector surface, the impinging fiber/fluid mixture produces turbulence on impact with the surface and results in the production of a non-uniform filter fabric. If the collector vacuum is too high, the fiber/fluid mixture is drawn onto the porous surface of the collector resulting in a patterning of the surface of the fabric. Excessive vacuum also influences the bulk density of the resulting product by forcing the product to a lesser thickness, which result in a product which has limited flow-through rates.

The collector distance also primarily influences the formation of the filter fabric. If the distance from the die to the low-pressure surface is too small, insufficient cooling of the microfibers occurs. This results in a filter fabric which is only marginally fibrous in nature due to individual blown fibers bonding together prior to their solidification and is therefore unable to remove fine particulate matter. If this distance is too great there is sufficient spreading, slowing, and interaction of the fiber/fluid stream as to allow the entangling of many microfibers. This results in relatively large agglomerates of fibers or "ropes", which do not become sufficiently entangled into the web and result in non-uniform filter fabrics. The collector distance of the invention is preferably between 10 and 50 centimeters.

The two-layer composite filter web of the present invention is made by combining the preformed support web and the preformed microfiber filter. If the microfiber web is collected on the support web, the resultant filter has significantly higher and undesirable flow times.

Filters utilizing the composite web of the present invention are formed in various ways depending upon the equipment to be used with the resultant filter. In the case of gravity filters, a simple wire frame such as depicted in FIG. 1 may be used to support a cone-shaped filter. The cone-shaped filter may be formed from a half circle or a rectangular piece of composite filter material. Filters of this invention are formed with support web on the outlet side of the filter, i.e., that side of the filter where the liquid exits. One edge of a folded half circle or folded rectangle is sealed by appropriate means such as sewing, heat fusion, impact sealing or other conventional methods. For some pressure filters, only a sheet or disc of the composite filter web is required. In other cases a closed bag with an inlet is formed. In both machine filters, the composite web is oriented so that the contaminated cooking oil passes through the filter layer first.

A somewhat surprising observation is that the filter of the present invention, when used as a gravity cone filter, while being significantly slower than commercially available products when filtering shortening at room temperature, was about equal in speed to the commercially available filters when used to filter shortening at 120°–180° C. The filter of the present invention was significantly more efficient than commercially available filters.

Examples 1–7 show the preparation of blown microfiber web for evaluation as cooking oil filters.

EXAMPLES 1–7

Blown microfiber webs were prepared from nylon 6 resin on a 5-zone Johnson 76 mm extruder. In Example 1, the nylon 6 resin was Adell Type BS-10-SW available from Adell Plastics, Inc. and, in Examples 2–7, the nylon resin was that available from Nylon Corporation of America under the trademark "Fosta" 438. The extruder was equipped with a 30:1 length to diameter ratio screw. The polymer was extruded at an output rate of 36 kg of polymer per hour. The temperature profile of the extruder for all seven examples was as follows: Zone 1—250° C.; Zone 2—330° C.; Zone 3—370° C.; Zone 4—380° C.; Zone 5—380° C. The polymer entered a 760 mm wide microfiber die at a temperature of 380° C.

The microfiber die had a row of narrow side-by-side equilateral triangular orifices each having a 0.305 mm height through which molten material was extruded. On each side of the row of orifices were 0.38 mm slot openings through which air was blown at high velocity and to impinge on the molten polymer stream. The stream of air drew out the molten extruded material into fibers, cooled the fibers to a solidified form, and carried the fibers to a collector as a fiber stream.

The collector was a finely perforated screen cylinder having 1 mm diameter screen holes with an openness of 20%. A vacuum plenum behind the screen and inside the cylinder was positioned where the fiber stream impacted the outside of screen cylinder.

Process conditions for Examples 1–7 were as follows: die melt temperature: 380° C., die temperature: 370° C., and temperature of air expelled from the die: 285° C.

The web weight was controlled by the collector speed. The process parameters, die air flow, vacuum applied behind the collector screen (collector vacuum), and the distance of the collector from the lip of the die are listed in Table I.

TABLE I

| Ex. No. | Web Wt. (g/m²) | Die Air Flow (m³ sec.) | COLLECTOR Speed (m/sec.) | Distance (mm) | Vacuum (Pa) |
| --- | --- | --- | --- | --- | --- |
| 1 | 38 | 0.106 | 0.229 | 406 | 50 |
| 2 | 47 | 0.094 | 0.198 | 483 | OFF |
| 3 | 48 | 0.123 | 0.198 | 381 | 1120 |
| 4 | 45 | 0.165 | 0.198 | 305 | 1120 |
| 5 | 64 | 0.094 | 0.147 | 559 | OFF |
| 6 | 59 | 0.165 | 0.147 | 356 | 500 |
| 7 | 65 | 0.179 | 0.147 | 254 | 1120 |

The webs of Examples 1–7 were analyzed for web weight, thickness, density, pressure drop, flow time, and efficiency by the following test methods:

(a) Web Weight

A 406×406 mm sample was cut from the web and weighed on a balance to the nearest 0.01 gram. This sample was used in all the following tests.

(b) Thickness

The sample was analyzed for thickness by a method based upon a procedure described in ASTM D 1777-75. Working details of the method are given below.

The sample was placed on a flat anvil of a thickness measuring device and a 305 by 305 mm flat pressure foot which was parallel to the anvil was loaded to 69 Pa and allowed to rest on the sample for 30 seconds, after which time the load and the pressure foot were removed. The sample was allowed to recover for 30 seconds. The pressure foot was then loaded to 13.8 Pa and allowed to rest on the sample for 30 seconds. At the end of this time, the web thickness was measured with the pressure foot in contact with the web.

(c) Density

From the weight of the sample and its thickness, density was calculated using the formulae:

$$S_v = \frac{S_t \times 10^3}{S_w} \quad \quad 1.$$

$$1/S_v = S_d \quad (2)$$

Formula 1 determines the specific volume ($S_v$) of the sample from the sample thickness ($S_t$), in millimeters, and the sample weight ($S_w$), in grams/square meters. Formula 2 determines the web density ($S_d$) in grams/cubic centimeters, from the specific volume ($S_v$) of the web.

(d) Pressure Drop

The 406×406 mm sample was placed across an air tunnel having a test air velocity of 0.34 m³/sec per m² of opening. The pressure drop was recorded in Pascal Pa.

(e) Flow Time

The 406×406 mm test piece was placed on a cone-shaped holder made from window screen so that the test piece was centered and forced to take the general shape of a cone without destroying the web. Then 300 ml of new cooking oil available under the trade designation "Crystal" heavy duty clear shortening from Hunt-Wesson Foods. Inc. at room temperature was poured into the cone-shaped web. The time to collect 200 ml of the oil filtrate was recorded.

With the sample still in the screen holder, the remaining oil is allowed to drain from the web.

(f) Efficiency Test

A test oil was made by combining 100 parts by weight of new liquid vegetable frying oil with 0.5 parts standard coarse dust AC Spark Plug Part #1543637 available from the AC Spark Plug Division of the General Motors Corporation.

A portion containing 150 milliliters of the oil-dust mixture was poured into the cone-shaped web. A portion containing 100 milliliters of the oil mixture filtrate was collected and vacuum filtered through a piece of pre-weighed Whatman No. 4 filter paper fitted in a Buchner funnel.

The container used to collect the 100 ml oil filtrate was rinsed four times with 20 ml of hexane. These rinsings were filtered on the same filter paper. The filter paper is rinsed with an additional 100 ml hexane in 25 ml aliquots to remove all traces of oil.

The filter paper is dried in a 60° C. oven for 10 minutes, cooled to ambient temperature and weighed. The amount of dust residue passing through the test filter was calculated by subtracting the weight of the pre-weighed Whatman filter paper from weight of the paper after drying at 60° C.

The efficiency of the microweb filter was calculated from the following formula:

$$100\% - \left(\frac{\text{dust residue, g}}{0.5 \text{ g}} \times 100\right) = \text{efficiency (\% removed)}$$

Tables II and IIA show the results of the analysis:

TABLE II

| Sample Number | Web Weight g/m² | Thickness (mm) | Density (g/cc) | Pressure Drop (Pa) |
|---|---|---|---|---|
| 1 | 38 | 0.011 | 0.08 | 32 |
| 2 | 47 | 0.020 | 0.06 | 17 |
| 3 | 48 | 0.020 | 0.06 | 75 |
| 4 | 45 | 0.011 | 0.10 | 160 |
| 5 | 64 | 0.021 | 0.08 | 70 |
| 6 | 59 | 0.016 | 0.09 | 145 |
| 7 | 65 | 0.016 | 0.11 | 177 |

TABLE IIA

| Example Number | Flow Time (Seconds) | Efficiency (% Removed) |
|---|---|---|
| 1 | 30 | 85 |
| 2 | 22 | 72 |
| 3 | 76 | 89 |
| 4 | 150 | 95 |
| 5 | 54 | 92 |
| 6 | 121 | 100 |
| 7 | 160 | 100 |

EXAMPLE 8

The web of Example 1 was combined with a rayon scrim cloth to make a composite suitable for fabrication into a filter for cooking oil. The rayon scrim cloth was a spun-bonded nonwoven available from Rock River Manufacturing Corporation under the trade designation No. 1449. The scrim weighed 33.5 g/m², was 0.20 mm thick, had a pressure drop of less than 25 Pa. and a flow time of 11 seconds as measured per previously described test methods. The composite web of this example was made by laying the preformed blown microfiber web of Example 1 on the rayon scrim cloth.

The composite web of this example had a flow time of 38 seconds and efficiency of 91%.

EXAMPLE 9

The composite web of Example 8 was fabricated into cone filters suitable for gravity filtration of frying oils by taking a 508×254 mm sheet of the composite web and folding along the 254 mm width so that the rayon scrim cloth was on the outer surface. One of the open edges contiguous with the folded edge was ultrasonically sealed on a Branson Sonic Welder. The other two sides were left open. The open sides were separated to produce a cone having an outer rayon scrim layer and an inner blown microweb layer.

COMPARISON EXAMPLES 10 AND 11

Two commercially available cooking oil filters were evaluated in comparison to the filter of Example 9. The comparative example filter (10) was a nonwoven nylon filter sewn to form a cone and available under the trade designation "Filtrator" M-65 from the Filtrator Company.

The comparative Example 11 was a wet laid nonwoven formed from predominantly cotton fibers sewn to form a cone and available from Royal Paper Products, Inc. under the trade designation "Econoline" Filter Cone.

The performance of a gravity cone filter made from the composite of this example is given in Table III. The flow time and efficiency were tested per methods previously described. The Flow Time—22.7 kg test was run using a commercial deep fat fryer containing about 22.7 kg of mixed animal-vegetable shortening at 120° C.

TABLE III

| Filter | Flow Time | Efficiency | 22.7 kg Flow Test |
|---|---|---|---|
| Ex. 9 | 38 sec. | 91% | 236 sec. |
| Ex. 10 | 20 sec. | 63% | 250 sec. |
| Ex. 11 | 20 sec. | 60% | 201 sec. |

EXAMPLES 12 AND 13

Examples 12 and 13 show the preparation of fibrous support webs used in combination with microfiber webs of Examples 2–7.

Fibrous webs were used to make wet-laid paper and paper-like materials. The equipment comprises a large surge tank where the fibers are dispersed in water. The fibrous slurry material was metered to a smaller tank and allowed to flow out onto a moving fine mesh screen. A vacuum plenum was positioned behind the moving screen to assist in the deposition of fibers and the removal of water. The resulting fibrous mat was passed through two pressure rolls and then over subsequent heated rolls to remove excess moisture to a content of less than 10% by weight.

In Example 12, the composition of the fibrous pulp material was a mixture of 60 parts by weight cellulose hardwood fiber ("Harmac" F.B.L. Pulp) and 40 parts by weight rayon flock fiber ("Cellusude" 1.5 DPF×6.3 mm). The fibers were dispersed in water, 1.5 percent solids.

1.5 parts by weight of "Kymene" 725 resin (Hercules) by weight of fibers was added to the mix tank. The fibrous slurry was minimally mixed with no significant refinery of the pulp fibers. The fibrous slurry was used on the above described equipment to make a fibrous sheet of material. The speed of the moving screen was adjusted such that the basis weight of the dried fibrous sheet was 27 g/m². The sheet had a thickness of 0.2 mm and a Gurley densometer value of less than one second.

The porosity of fibrous support webs is an important criterion in determining their usefulness. The following methods were used to evaluate this characteristic.

A sample of the sheet was folded into the shape of a cone. The cone-shaped sheet was placed in a cone-shaped holder made from a screen mesh commonly used as a window screen. 150 ml of new liquid vegetable frying oil was poured into the cone-shaped sheet and the time to collect 120 ml of oil filtrate was recorded.

The fibrous sheet of Example 12 passed 120 milliliters of oil filtrate in less than 60 seconds.

In Example 13, 100 parts, by weight, of cellulose hardwood pulp ("Harmac" F.B.L. Pulp) was mixed with 1.5 parts "Kymene" 725 resin (by weight of total cellulose) were slurried in water at 1.5% solids. Again, no refining of the fibers was done. The slurry was used on the above described equipment to make a fibrous sheet.

The speed of the moving screen was adjusted such that the basis of the dried sheet was 54 g/m$^2$. The sheet was 0.41 mm and a Gurley densometer value of two seconds.

When fibrous support webs have a basis weight of more than 27 g/m$^2$, another method, given below, was used to evaluate their suitability. A sample of the sheet was cut to fit a 100 mm diameter Buchner funnel. The Buchner funnel with the test fibrous support sample web was fitted to a suction flask. A 150 milliliter portion of new liquid vegetable frying oil was poured into the funnel and a vacuum of $3.38 \times 10^4$ Pa. was applied. The time to filter all the oil through the test sample was recorded. The sheet of Example 8 passed the 150 milliliters of oil in 28 seconds.

EXAMPLES 14–16

Examples 14–16 show the combining of fibrous support web of Example 12 with blown microfiber webs of Examples 2–4 and the fabrication of cone filters and evaluation of these filters.

The paper sheet of Example 12 was combined with the blown microfiber (BMF) from each of Examples 2–4. The paper sheet served as a support media for the microfiber webs. A sheet of paper/BMF of a size of 508 by 254 mm was cut from the composite web. The paper/BMF composite web was folded along the 254 mm width such that the paper sheet was the outer surface of the article. One of the open sides continuous with the folded side was ultrasonically sealed on a Branson Sonic Sewer. Other means of closure, e.g., sewing machine using thread, could also be used. The other two sides were left open. The open sides were separated to produce a cone having an outer paper layer and an inner BMF web layer.

In this case, the filter had a triangular shape with a height of 25.4 mm and a base length of 495 mm.

The three resulting cone filters, Examples 14–16, were evaluated as filters for deep-fat frying shortening.

Example 14 combines microfiber web of Example 2 and support web of Example 12. Example 15 combines webs of Example 3 and 12 and Example 16 combines the webs of Examples 4 and 12.

A 15.8 kg portion of solid frying shortening (Aslesen's "AV Blend") was heated to 175° C. in a "Frymaster" deep fat gas heated fryer for the evaluation. Breaded onion rings were fried in about three batches until 2.3 kg of onion rings had been fried. The oil was then filtered, without cooling, through a cone filter of Example 14. This procedure was repeated to evaluate the cone filters of Example 15 and 16.

Table IV shows the test results and the ratings of these examples.

TABLE IV

| Ex. No. | Time to Empty Fryers (Sec.) | Condition of oil (Cloudy-Clear) | Rating |
| --- | --- | --- | --- |
| 14 | 240 | Cloudy | Poor-low efficiency |
| 15 | 325 | Clear | Good |
| 16 | 480 | Very clear | Poor-too slow |

Examples 17–19 show the combining of the fibrous support web of Example 13 and microfibrous web of Examples 5, 6, and 7 and the evaluation of these combinations as vacuum fry oil filters.

EXAMPLES 17–19

The paper sheet of Example 13 was combined by layering with the blown microfiber web from each of Examples 5–7. The paper sheet served as a support media for the microfiber web. A 38 cm circular sheet of paper/blown microfiber web was cut from the composite web. The composite circular sheet was placed in a vacuum filter available under the trade designation Model A-50 "ReNu".

Example 17 combines support web 13 with the microfiber web of Example 5, Example 18 combines the web of Example 13 with microfiber web of Example 6, and Example 19 combines support web of Example 13 with the microfiber web of Example 7.

The "Frymaster" deep fat gas heated fryer, as described in Examples 14–16, was used in this filter evaluation. Conditions of the frying shortening were the same as described in Examples 14–16, except, 3.4 kg of breaded onion rings were fried prior to filtering the oil through filters of Examples 17, 18 and 19.

A commercially available diatomaceous earth impregnated paper filter was used as a comparative Example 20.

The filter media was placed in the vacuum filter as described above. The hot (175° C.) oil was drained from the fryer onto the filter and the pump immediately started. Some of the filtered frying oil from the return hose was used to rinse down the side walls of the fryer. This rinsing procedure took no more than two minutes. The valve on the fryer was closed starting then. The time to drain the filter to dryness was recorded in seconds.

Table V shows the results and ratings of Examples 17–19 and Comparative Example 20.

TABLE V

| Ex. No. | Time to Drain Filter (Sec.) | Condition of oil (Cloudy-Clear) | Rating |
| --- | --- | --- | --- |
| 17 | 95 | Clear | Poor-low efficiency |
| 18 | 95 | Very clear | Good |
| 19 | 95 | Very clear | Good |
| 20 | 420 | Very clear | Poor-too slow |

The normal pump capacity with no filter media used is 95 seconds.

I claim:

1. A cooking oil filtering apparatus especially suited for gravity filtration, said apparatus comprising a frame and a filter in the shape of a cone or a bag supported in said frame comprising an assembly of juxtaposed layers, as follows:
   (a) an inside filter layer formed of a uniformly porous web comprising uniformly distributed, randomly interentangled, synthetic polymeric, blown microfibers that are less than 10 microns in diameter, said web having a weight in the range of about 30 to 47 g/m$^2$, a flow time to pass 200 ml of cooking oil of less than about 40 seconds, and a pressure drop of less than about 42 Pa, and
   (b) an outside support layer of a highly porous, relatively stiff, light weight sheet material, more porous than said filter layer
wherein said layers are formed of materials which are resistant to thermal degradation and appreciable softening at normal cooking temperatures of said cooking oil and are disposed within said frame with said filter layer positioned to initially receive cooking oil passing through said layers.

2. The cooking oil filtering apparatus of claim 1 wherein said filter layer has a flow time of 22 to 40 seconds and a pressure drop of 17 to 42 Pa.

3. The cooking oil filtering apparatus of claim 1 wherein said support layer is a spun bonded rayon scrim having a pressure drop of less than 25 Pa.

4. A cooking oil filtering apparatus comprising a frame and a filter supported in said frame comprising an assembly of juxtaposed layers, as follows:
   (a) a filter layer in the shape of a disc formed of a uniformly porous web comprising uniformly distributed, randomly interentangled, synthetic polymeric, blown micro-fibers that are less than 10 microns in diameter, said web having a weight in the range of 60–200 gm$^2$; and
   (b) a support layer of a highly porous, relatively stiff, light weight sheet material, more porous than said filter layer wherein said layers are formed of materials which are resistant to thermal degradation and appreciable softening at normal cooking temperatures of said cooking oil and are disposed within said frame with said filter layer positioned to initially receive cooking oil passing through said layers and wherein said frame is a housing having an inlet on one side of said filter having said filter layer and an outlet on the opposite side of said filter having said support layer and including a means of applying a higher pressure on the inlet side of said filter than on the outlet side of said filter.

5. A cooking oil filter especially suited for gravity filtration, said filter being in the shape of a cone or a bag and comprising an assembly of juxtaposed layers, as follows:
   (a) an inside filter layer formed of a uniformly porous web comprising uniformly distributed randomly, interentangled, synthetic polymeric blown micro-fibers that are less than 10 microns in diameter, said web having a weight in the range of about 30 to 47 g/m$^2$, a flow time to pass 200 ml of cooking oil of less than 40 seconds, and a pressure drop of less than about 42 Pa; and
   (b) a support layer of a highly porous, relatively stiff, light weight sheet material, more porous than said filter layer wherein said layers are formed of materials which are resistant to thermal degradation and appreciable softening at normal cooking temperatures of said cooking oil and are disposed with said filter layer positioned to initially receive cooking oil passing through said layers.

6. The cooking oil filter of claim 5 wherein said filter layer has a flow time of 22 to 40 seconds and a pressure drop of 17 to 42 Pa.

7. The cooking oil filter of claim 5 wherein said support layer is a spun bonded rayon scrim having a pressure drop of less than 25 Pa.

* * * * *